UNITED STATES PATENT OFFICE.

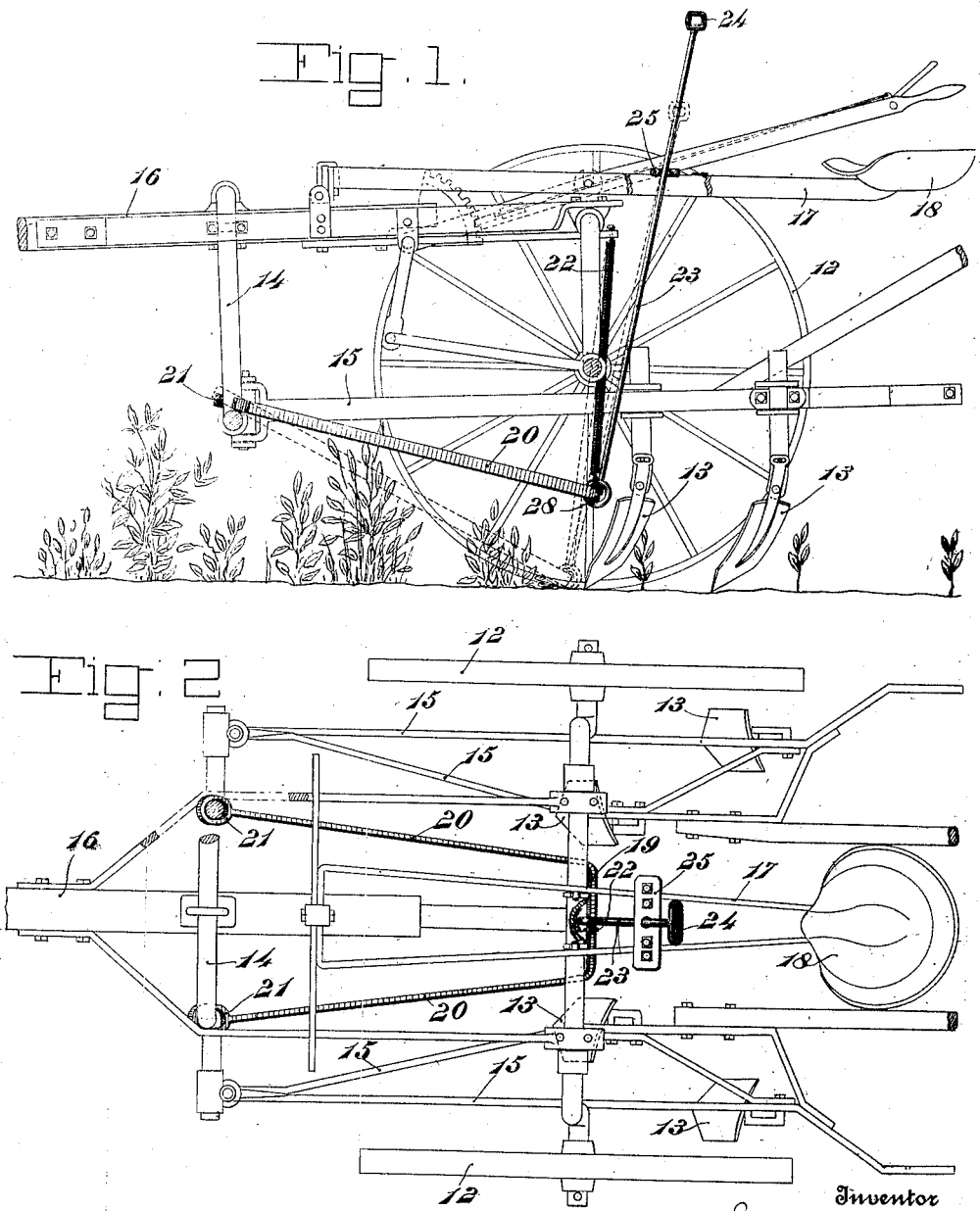

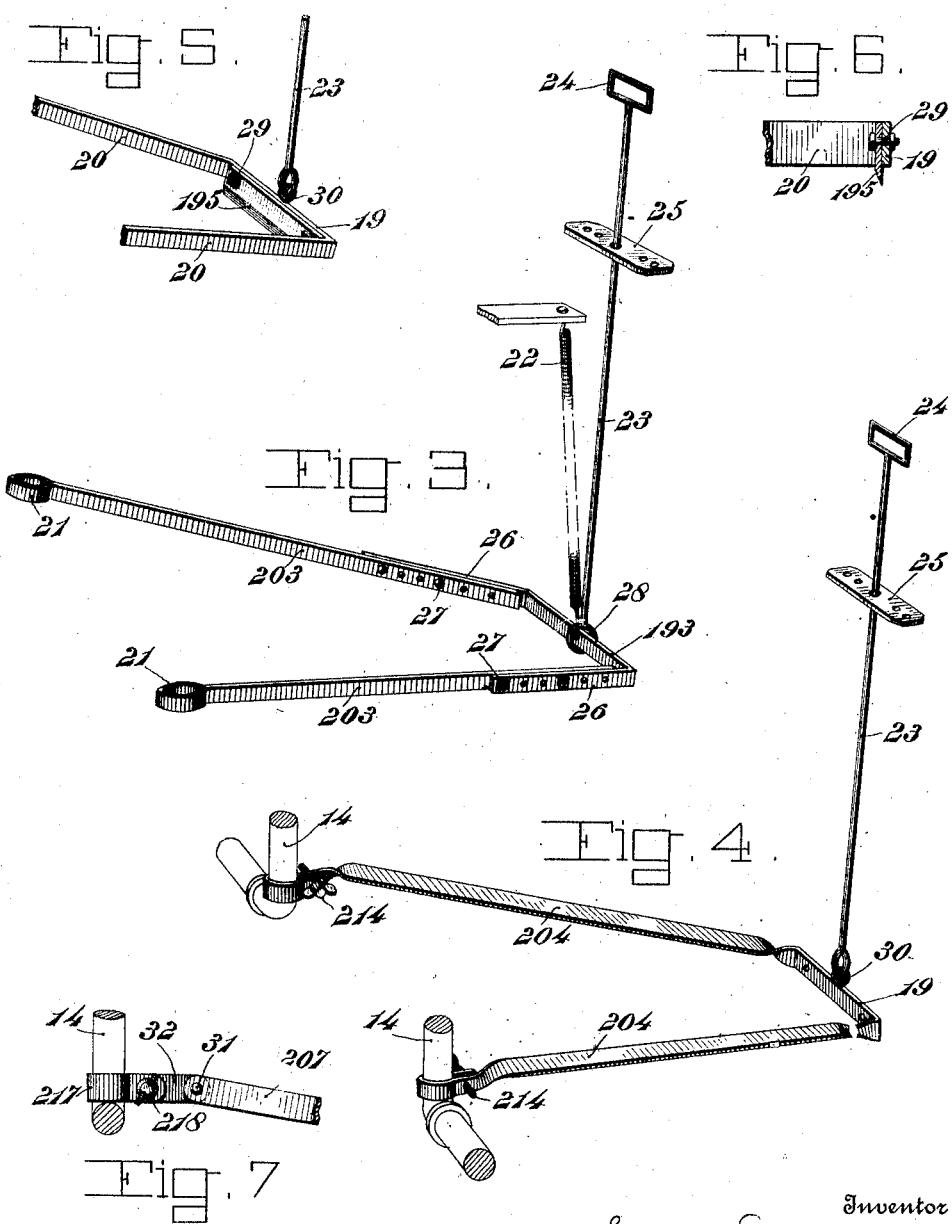

FRANK LOCKETT, OF MENO, OKLAHOMA.

CULTIVATOR ATTACHMENT.

1,043,119.         Specification of Letters Patent.      Patented Nov. 5, 1912.

Application filed September 23, 1911. Serial No. 650,880.

*To all whom it may concern:*

Be it known that I, FRANK LOCKETT, a citizen of the United States, residing at Meno, in the county of Major and State of Oklahoma, have invented or discovered certain new and useful Improvements in Cultivator Attachments, of which the following is a specification, reference being had therein to the accompanying drawings.

This invention has for its object to provide mechanism for thinning the plants in rows of growing crops and for destroying weds in such rows which cannot conveniently be reached by an ordinary cultivator, and especially to provide a device of this character which may be applied to cultivators of any usual or well known form already in use.

These and other objects of the invention, together with means whereby the same may be carried into effect, will best be understood from the following description of certain forms or embodiments thereof illustrated in the accompanying drawings. It will be understood, however, that the constructions described and shown have been chosen for illustrative purposes merely and that the invention may be embodied in other forms without departing from the spirit and scope thereof.

In said drawings: Figure 1 is an elevation, partly in vertical section, of a cultivator having my improvement applied thereto. Fig. 2 is a plan view of the same partly broken away. Fig. 3 is a perspective view of the thinning and weeding device removed from the cultivator, and showing a slightly modified construction. Fig. 4 is a similar view of another modification. Figs. 5, 6 and 7 are detail views illustrating further modifications to be referred to.

The cultivator shown in Figs. 1 and 2 may be of substantially any well known form comprising, in general, a body or frame mounted on wheels 12 and carrying the usual cultivator blades 13, herein shown as four in number arranged in pairs on opposite sides of the frame. The particular construction of cultivator body forms no portion of the present invention, but usually and as herein shown includes, among other parts, a forward yoke 14, by which the forward end of the cultivator blade frame 15 is supported from the tongue 16, and a bracket 17 supporting a seat 18.

The thinning and weeding device forming the subject of the present invention comprises a plant engaging member, herein shown as a bar 19 arranged transversely of the cultivator frame between two opposite cultivator blades 13. Said bar is supported by arms 20 and connects the lower and rearward ends of said arms, the opposite or forward ends of the arms being connected with the cultivator frame.

As shown in Figs. 1 and 2 the forward ends of the arms 20 are provided with loops or eyes 21 which loosely engage the upright portions of the forward yoke 14, thereby permitting the plant engaging member 19 to be elevated and depressed relative to the cultivator frame.

The plant engaging member is held normally elevated, or in the inoperative position shown in full lines in Fig. 1, by means of a spring 22 connected at its lower end with the bar 19 and at its upper end to a suitable part of the cultivator frame. Said device may be depressed, or moved into the operative position shown in dotted lines in Fig. 1, by means of an operating rod 23 connected at its lower end to the bar 19 and preferably provided at its upper end with an operating handle 24 arranged in convenient proximity to the seat 18, said rod being guided in an opening in a plate 25 secured to the arms of the seat bracket 17. The construction is such that the member or bar 19, when depressed, will occupy a position substantially opposite the adjacent cultivator blades 13 between which it is located, that is to say in line, transversely of the machine, with said blades or, preferably, slightly in advance thereof, as shown in dotted lines in Fig. 1.

In operation the cultivator is driven along the plant row in the usual manner, the bar 19 normally passing over all plants in said row. When it is desired to destroy a plant or weed the rod 23 is depressed, thereby moving the bar 19 downwardly in the direction of movement of the cultivator and into engagement with the plant or weed. The forward movement of the cultivator thereupon causes said plant to be pulled down into a position where it will be immediately covered over by the adjacent cultivator blades 13. After the destruction in this manner of the plant or weed it is desired to remove, the pressure on the handle 24 of the rod 23 is released, whereupon the spring 22 returns the bar 19 to its normal position.

As shown in Fig. 3 the device is made adjustable in length, and to this end the plant engaging member or bar 19³ is made separate from the arms 20³ and is provided with angular extensions 26 each of which is provided with a plurality of apertures coöperating with similar apertures in the arms 20³, said apertures being arranged to receive bolts 27 whereby the bar 19³ and arms 20³ may be connected in any desired position. As shown in this figure and also in Figs. 1 and 2, the rod 23 is connected with the plant engaging bar by means of an eye or ring 28 integral with said rod and passing around said bar.

In the construction shown in Fig. 4 the elevating spring 22 is dispensed with, the arms 20⁴ being made resilient, as of spring steel, and being rigidly attached to the forward yoke 14 as by clamp screws 21⁴. In this construction the elasticity of the arms 20⁴ maintains the plant engaging member 19 in its normal elevated position, said arms being flexed by the rod 23 in order to depress said bar, as above described.

As shown in Figs. 5 and 6 the plant engaging bar 19 is provided with a cutting blade 19⁵ detachably connected with said bar by bolts 29. With this arrangement the engagement of the bar 19 with the plant serves to cut said plant off and destroy the same in this manner rather than by merely pulling the same down to be covered by the cultivator blades as above described. In the constructions shown in Figs. 4 and 5 the operating rod 23 is connected with an eye 30 carried by the bar 19.

In the construction shown in Fig. 7 the arms 20⁷ are pivoted at 31 to arms or brackets 32 projecting from collars 21⁷ secured to the upright portions of the forward yoke 14, as by clamp screws 21⁸. In this construction an elevating spring similar to the spring 22 in Figs. 1 and 3 will preferably be employed.

Further modifications of the invention will readily suggest themselves to those skilled in the art. The device is preferably arranged for manual operation, but it will be seen that the operating rod 23 may, if desired, be connected with any suitable mechanism whereby the same will be automatically and periodically depressed.

Having thus described my invention I claim and desire to secure by Letters Patent:

The combination with a cultivator comprising a body and cultivator blades carried thereby, of thinning and weeding mechanism comprising a plant engaging bar arranged transversely of said body between said blades and means for supporting and operating said bar constructed and arranged to move said bar into a position substantially opposite said blades, whereby, as said cultivator advances, a plant engaged by said bar will be depressed thereby into a position to be covered by said cultivator blades.

In testimony whereof I affix my signature, in presence of two witnesses.

FRANK LOCKETT.

Witnesses:
L. A. FERREL,
N. J. GRAF.